United States Patent [19]

Milner

[11] Patent Number: 5,731,900
[45] Date of Patent: Mar. 24, 1998

[54] OPTICAL REFLECTOR

[76] Inventor: Peter James Milner, 8 Juliet Close, Nuneaton, Warwickshire, CV11 6NS, United Kingdom

[21] Appl. No.: 142,415

[22] PCT Filed: May 22, 1992

[86] PCT No.: PCT/GB92/00945

§ 371 Date: Nov. 18, 1993

§ 102(e) Date: Nov. 18, 1993

[87] PCT Pub. No.: WO92/20553

PCT Pub. Date: Nov. 26, 1992

[30] Foreign Application Priority Data

May 24, 1994 [GB] United Kingdom ............... 9111331

[51] Int. Cl.$^6$ ...................................................... G02B 27/10
[52] U.S. Cl. ........................... 359/627; 359/640; 359/837
[58] Field of Search ................................ 359/527, 533, 359/543, 546, 548, 840–841, 850–851, 855–857, 861, 837, 625, 627, 640

[56] References Cited

U.S. PATENT DOCUMENTS 4,989,964  2/1991  Meise ................................ 359/850

FOREIGN PATENT DOCUMENTS

0279221   8/1988   European Pat. Off.
WO9014971 12/1990  WIPO.

*Primary Examiner*—James Phan
*Attorney, Agent, or Firm*—Morrison Law Firm

[57] ABSTRACT

An optical reflector is formed by an array of reflecting surfaces arranged one behind another in spaced, generally parallel, relation along a main axis of the array. The reflector has entry and exit faces (11, 12) disposed on opposite sides of, and extending along, the array main axis. The spaces between the reflecting surfaces is preferably occupied by a refractive material. In this case, light entering through the entry face (11) is first refracted and then reflected before being refracted again on leaving through the exit face (12). The main extent of the reflector is unlike a conventional mirror, normal to the plane of reflection. The reflector is thus well suited for use as a vehicle external rearview mirror as it has minimal lateral protection. A reflector array may be produced from a stack of elongate elements having optically worked faces.

20 Claims, 8 Drawing Sheets

OPTICAL REFLECTOR

BACKGROUND OF THE INVENTION

The present invention relates to an optical reflector suitable for a wide range of use including, for example, use as an external vehicle rear view mirror.

A conventional reflector, or plane mirror, such as used, for example, as an external rear view mirror of a vehicle, can present problems due to its substantial lateral extent, that is, its extent in the plane of the reflector. Such problems include aerodynamic drag exerted by laterally projecting exterior mirrors. At medium and high speeds, the aerodynamic drag factor may account for up to 80% of the total mechanical energy loss resulting in both increased fuel consumption and noise. Furthermore, although exterior rear-view mirrors are designed to yield under impact, they remain a traffic hazard. Mirror yield is of most benefit in very low speed impacts. In higher speed impacts, whether against another mirror or a pedestrian, mirror inertia plays an important role and considerable damage and/or injury can occur.

OBJECTS AND SUMMARY OF THE INVENTION

It is an object of the present invention to provide an optical reflector. The optical reflector of the present invention is suitable for use as a motor vehicle rear-view mirror, but this example is given without prejudice to the generality of the invention which can also be applied to a wide range of other uses.

According to one aspect of the present invention, there is provided an optical reflector having a plurality of elongate elemental reflectors in an array spaced from one another in a direction generally parallel to the optical axis of each individual elemental reflector whereby to provide a composite image of an object viewed from at least a limited range of angles to one side of the array, in which each elemental reflector is formed as a transparent face or facet of a transparent body having two opposed surfaces, such that light entering the reflector through one said surface and approaching the face or facet through the body at a certain angle or range of angles thereto is reflected by total internal reflection and exits the reflector through the other of the said surfaces, and such that light approaching the face or facet through the body at angles other than the said certain angle or range of angles is transmitted therethrough.

The elemental reflectors preferably all lie generally parallel to one another, with the optical axis of the reflector as a whole parallel to the optical axis of the individual elemental reflectors.

With such an arrangement, the main extent of the optical reflector is generally parallel to the optical axis of the reflector array (this being normal to the plane of reflection of the elemental reflectors which facilitates the use of the reflector in applications such as for a vehicle rear view mirror.

The transparent body consists of refractive material chosen such that a medium of lower refractive index, typically defining the interface at the said transparent face or facet, allows total internal reflection to take place.

Embodiments of the reflector may be formed in which, at least one of the entry and exit faces is provided with slots in the refractive-material body, these slots extending towards the opposite face and being so arranged that one surface of each slot constitutes a respective one of the said surfaces.

The size and/or inclination of the elemental reflecting surfaces may vary progressively along the array of reflecting surfaces. Furthermore, the axis of the array may be curved to enhance the viewing of close objects.

Preferably, the entry and/or exit faces on the refractive-material body has a respective elemental refractor facet associated with each said reflecting surface, each such facet being angled to the main axis of the array such as to modify the optical characteristics of the reflector. The physical parameters of the elemental refractor facet may be such that they vary progressively along the array.

The optical reflector can be combined with one or more refracting devices positioned across the entry and/or exit faces of the reflector to provide an optical reflector assembly having particular characteristics. Preferably, one surface of the refracting device is provided with multiple refracting faces. Where the optical reflector is formed by a refractive-material body provided with slots along one face, then the said one surface of the refracting device may be disposed adjacent to, and facing towards, the face of the reflector provided with the slots. As a result of this arrangement, the elemental reflecting and refracting surfaces of the overall assembly are internal of the assembly.

Light absorbing surfaces may provide for absorbtion of light which is not subject to the intended reflection and, where applicable, refraction.

The optical reflector can, with advantage, be used as a vehicle external rear-view mirror and to this end, the reflector can be provided with appropriate means for attaching it to a vehicle. Alternatively, it may be formed as part of a vehicle. Where the reflector is used as an external rear-view mirror on a vehicle, the array of reflecting surfaces will extend generally along the vehicle. Preferably, the end of the array nearer the front of the vehicle lies further from the longitudinal centre line of the vehicle than the end of the array near the vehicle rear. As a result, light at a narrow angle to the vehicle longitudinal axis can reach the forward end of the mirror which is the mirror part that processes this light; light from a wider angle is processed by the portion of the mirror lying nearer the rear of the vehicle. In order to reduce further the external extent of the mirror, the rear part of the mirror can, advantageously, be arranged to lie inside the natural envelope of the vehicle.

Various forms of optical reflector embodying the present invention will now be particularly described, by way of non-limiting example, with reference to the accompanying diagrammatic drawings, in which;

DETAILED DESCRIPTION OF THE PREFERRED EMBODIMENTS

Figure 1:
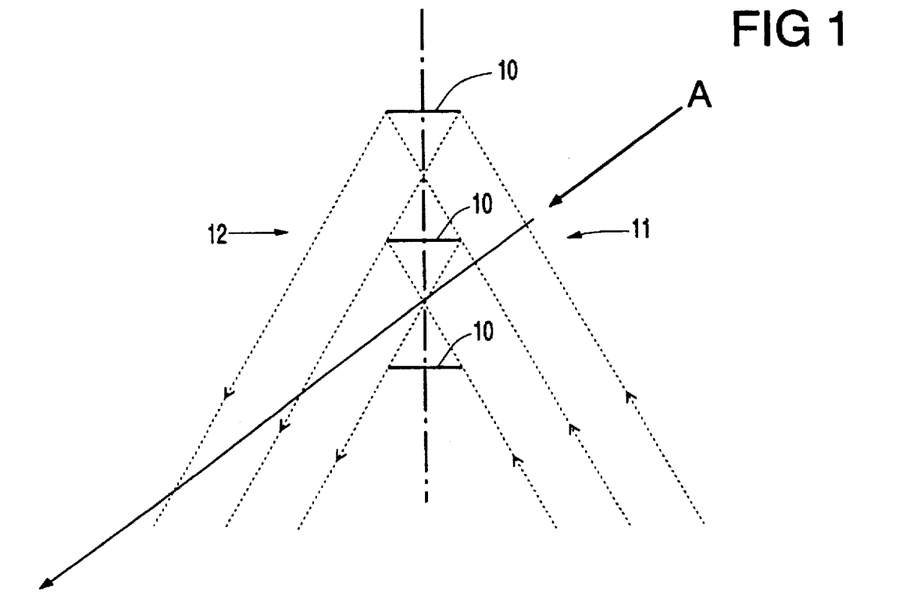
FIG. 1 illustrates the optical behaviour of light incident upon an optical reflector which does not constitute an embodiment of the present invention, comprising an array of elemental reflectors separated by air.

The general stacked array optical reflector, shown in FIG. 1 forms part of the state of the art useful for explaining the invention. It comprises an array of elemental reflectors 10, constituted, for example, by silvered mirrors. These elemental reflectors are arranged one behind another in spaced, generally parallel relationship along a main axis of the array. It will be understood that, in FIG. 1, the middle one of the three entry rays shown in fact represents two rays, one of which is reflected at the central elemental reflector 10 and the other, an adjacent ray which continues on to the next reflector face.

One side of the array of reflectors constitutes an optical entry face 11 for the reflector whilst the opposite side of the array constitutes an optical exit face. Taking the optical reflector in isolation, the role of the entry and exit faces is interchangeable. As can be seen, a substantial portion of the light entering the reflector through the entry face, undergoes a single reflection before exiting the reflector through the exit face 12.

For distant objects, the image formed by the elemental reflectors of the FIG. 1 reflector are compounded by the eye to form a composite image indistinguishable from that produced by a conventional mirror.

It should be noted that the physical size of the elemental reflectors 10 is not critical but a small size, typically less than one millimeter, can in some circumstances produce a subjectively better quality image than a larger size of typically more than five millimeters. This phenomenon is associated with the relative sizes of the elemental reflectors and the diameter of the pupil of the eye.

When the FIG. 1 reflector is viewed at angles other than the optimum or design angle, a proportion of the light from the object viewed is lost to the eye and, more significantly, a proportion of the light that enters the eye does not emanate from the object. In the case of the reflector illustrated in FIG. 1, this proportion of spurious light is about 5% for every degree of view angle away from optimum.

Figure 2:
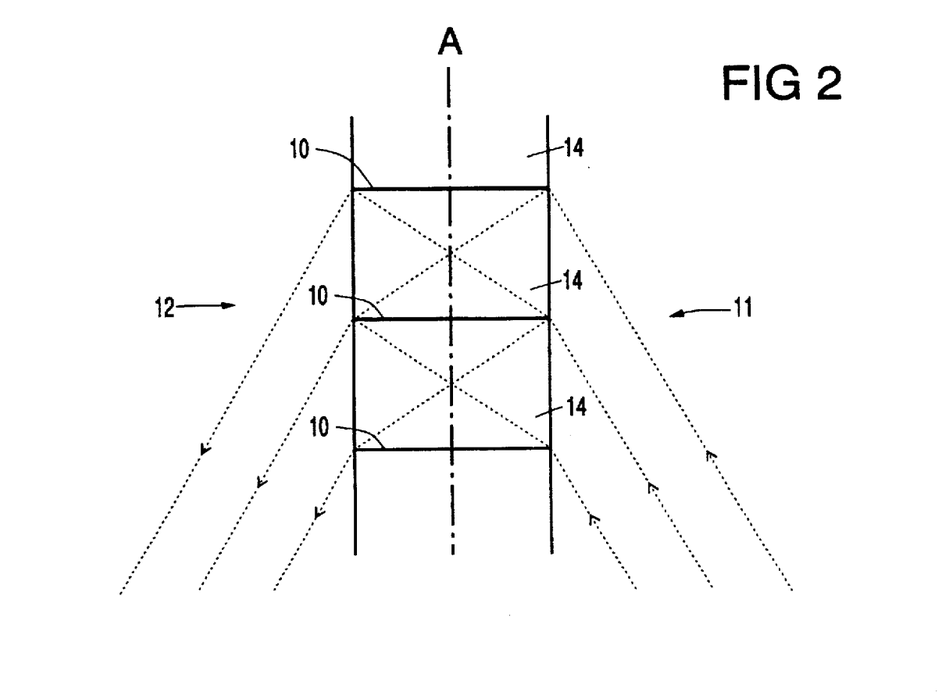
FIG. 2 illustrates the optical behaviour of light incident on an optical reflector embodying the present invention, in which an array of spaced elemental reflectors are defined by a body of refractive material.

FIG. 2 shows an optical reflector embodying the present invention. The FIG. 2 reflector is similar to that of FIG. 1 but now the spaces between the reflectors 10 have been filled by a refractive material in the form of blocks 14 of an acrylic medium. The increased lateral extent of the reflectors 10 in FIG. 2 is solely a result of the refraction that occurs as light crosses the air/block interfaces. The phenomenon of refraction is also responsible for an advantageous reduction in the spurious light effect for non-optimum viewing angles to about 2% per degree.

Another consequence of refraction at the entry and exit faces 11, 12 is that, for all practical viewing angles, the angle of incidence of the light at the reflectors 10 is greater than the critical angle for the acrylic medium. This means that the silvered reflectors 10 can dispensed with because each acrylic block is backed by air since reflection will take place by total internal reflection (TIR). It has been found that a satisfactory optical reflector can be made from a stacked array of optically transparent rods or strips, such as glass or an acrylic material, having generally flat parallel faces. The interfaces between two adjacent strips or rods in practice traps a small amount of air, which results in the total internal reflection of light incident on the face from within the body of the rod or strip; this occurs even if the contacting faces are optically flat since a very small quantity of air is nevertheless trapped between the two faces. Various other implementations of optical reflector relying on TIR are described below with reference to FIGS. 3 to 6.

Figure 3:
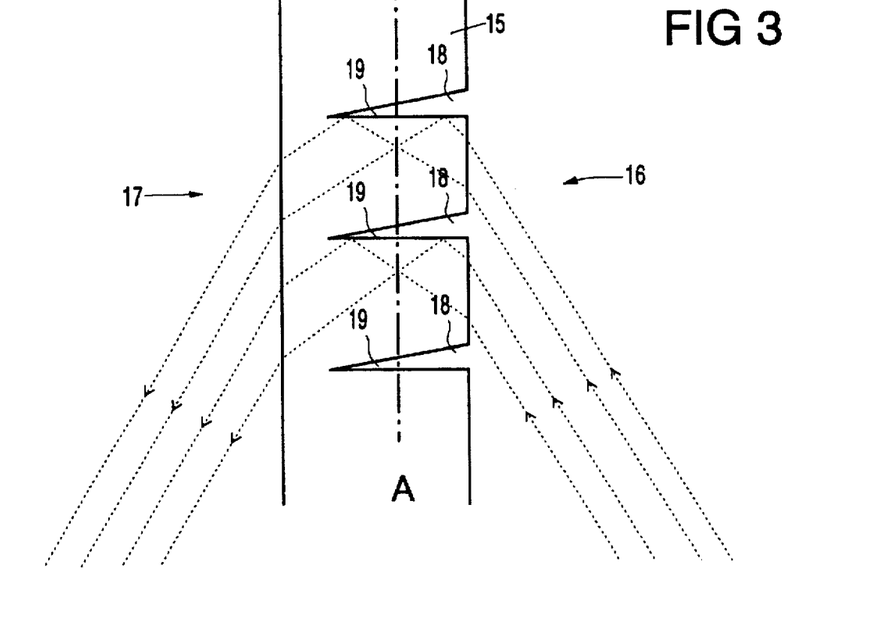
FIG. 3 illustrates the optical behaviour of light incident on a optical reflector embodying the present invention in which a body of refractive material is slotted to provide an array of spaced elemental reflector facets surfaces at which reflection occurs by total internal reflection.

In the optical reflector shown in FIG. 3, a single block of refractive material 15 (for example, an acrylic material) has two opposed faces 16, 17 that constitute optical entry and exit faces for the reflector. The entry face 16 is formed with a plurality of wedged-shaped slots 18 that extend from the face 16 part of the way through the block 15 towards the face 17. One surface 19 of each slot 18 forms an elemental reflector facet at which light approaching through the block 15 suffers a total internal reflection. The elemental reflector facets 19 are arranged one behind another in a spaced, generally parallel, relationship to form an array having a main A axis that extends along, and intermediate, the entry and exit faces 16,17 of the block 15.

As in the FIG. 2 reflector, a substantial portion of the light incident on the FIG. 3 reflector first undergoes refraction at the entry face 16 before being reflected at the elemental reflector facets 19 and undergoing further refraction at the exit face 17.

As can be seen from FIG. 3, it is not necessary for the elemental reflector facets 19 to extend the full width of the block 15 nor for the refracting interfaces to be up against the end of the reflector facets 19 (see the exit face 17 in FIG. 3). It should be noted that the rays shown in FIG. 3 and subsequent Figures are typical rays rather than limit rays, this being done in order to facilitate an understanding of the invention.

Figure 4:
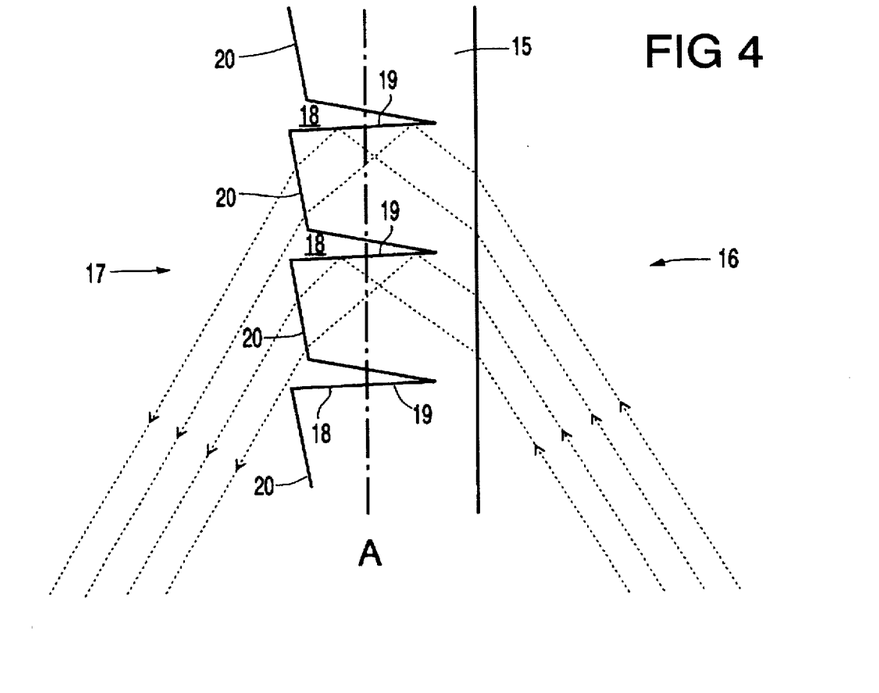
FIG. 4 is a diagram similar to FIG. 3 but showing another form of optical reflector.

The optical reflector shown in FIG. 4 is similar to that of FIG. 3 but in this case the wedge-shaped slots 18 are formed in the exit face 17 of the block 15. In addition, the exit face 17 has been configured such that the elemental refractive facet 20 associated with each respective elemental reflector facets 19 lies at an angle to the general direction of extent of the exit face 17. The angling chosen for each refractive facet 20 is such as to impart desired optical characteristics to the optical reflector, such as modifying image size.

Figure 5:
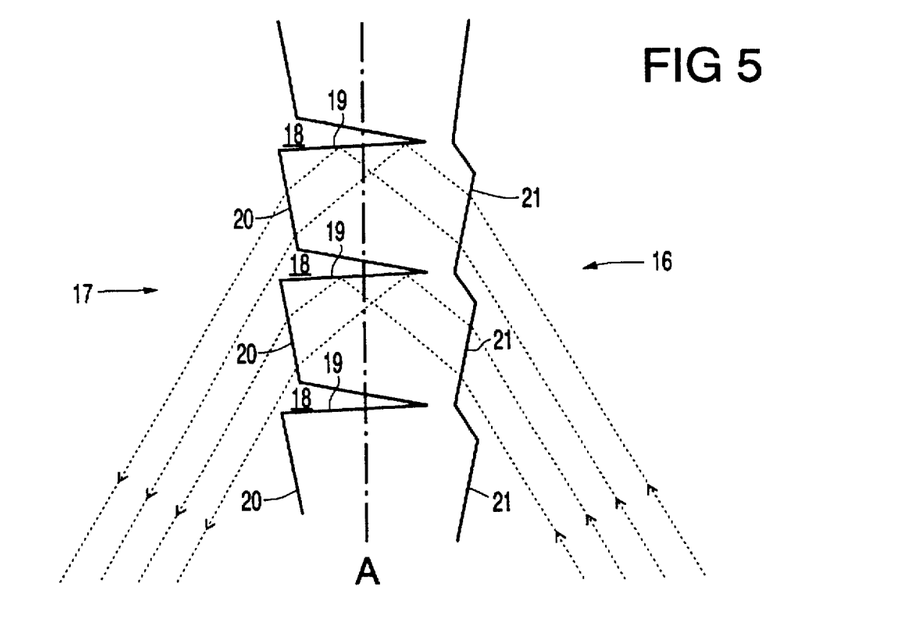
FIG. 5 is a diagram similar to FIG. 3 but showing a further form of optical reflector.

The optical reflector shown in FIG. 5 is similar to that of FIG. 4. However, in this case, not only has the exit face of the block been configured to provide angled refracting facets 20, but the entry face 16 has been similarly configured to provide refracting facets 21.

The required profiles of the optical reflectors of FIGS. 3,4 and 5 can, in principle, be produced by a number of different processes including, for example, where thermoplastic materials are involved, by injection and by compression moulding. Furthermore, as the profiles of the block 15 will generally be linear normal to the plane of the Figures, the desired profiles can be formed by rolling or turning processes.

The attractions of such rotary processes include relatively low cost of tooling and economic manufacture by a continuous flow type of production line.

Figure 6:
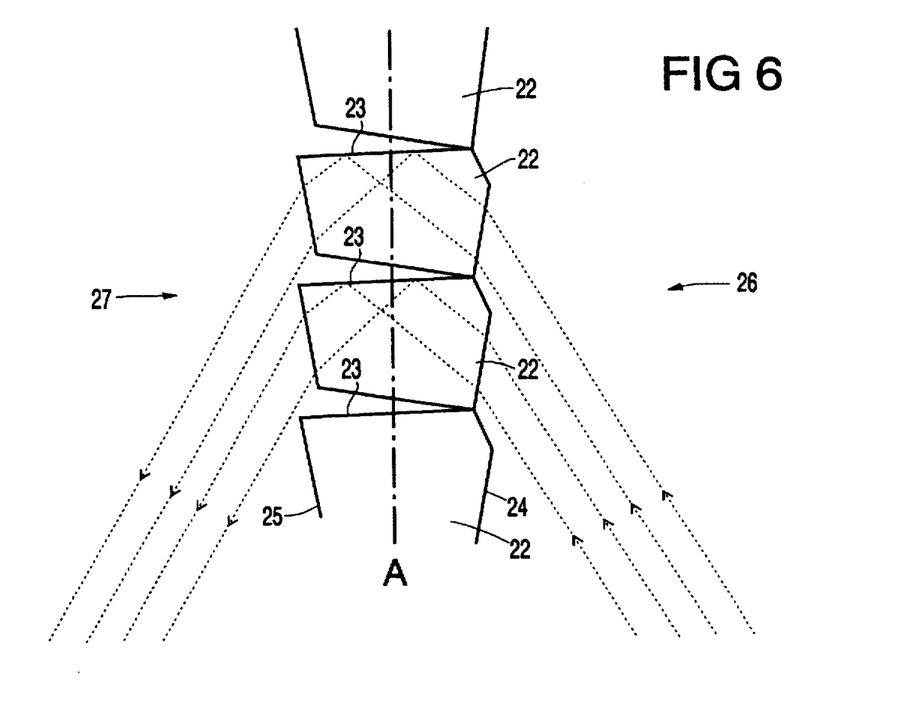
FIG. 6, is a diagram similar to FIG. 3 but showing a variation in the form of an optical reflector.

Although forming the reflector block 15 in one piece from sheet material is generally to be preferred, other ways of constructing the reflectors are possible. Thus, for example, reflectors of the general form shown in FIGS. 3,4 and 5 could be formed from discrete components as is illustrated in FIG. 6. More particularly, the FIG. 6 reflector comprises a plurality of refractive-material elemental blocks 22 fastened together (for example, at their ends) into the illustrated configuration with one surface of each block 22 providing an elemental reflecting surface 23. As with the reflector of FIG. 5, the FIG. 6 reflector has angled refractive facets 24 and 25 on both the entry and exit sides 26, 27 of the reflector.

Figure 7:
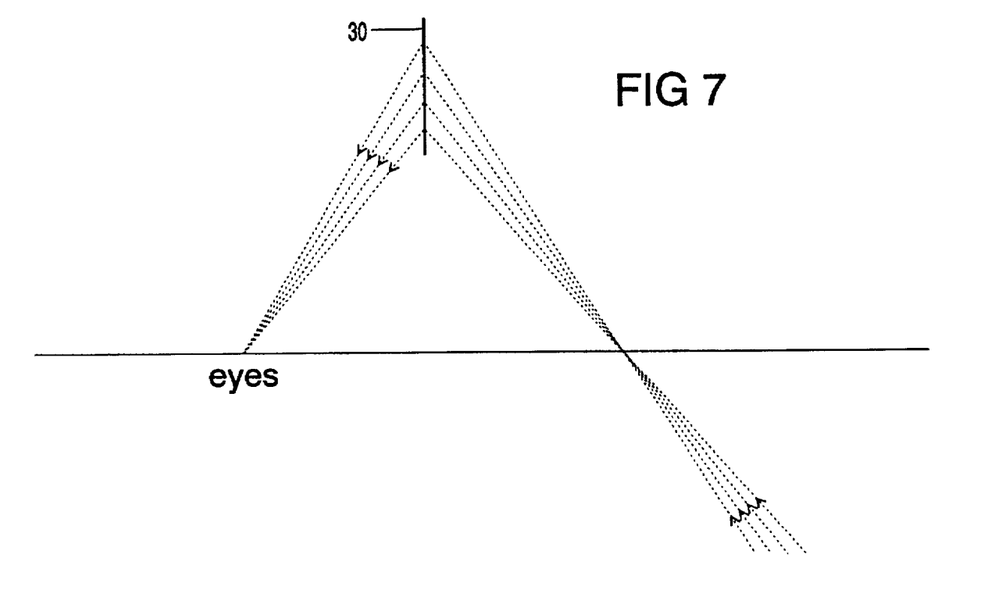
FIG. 7 is a beam field diagram for optical reflectors embodying the invention in the case of monocular vision.
Figure 8:
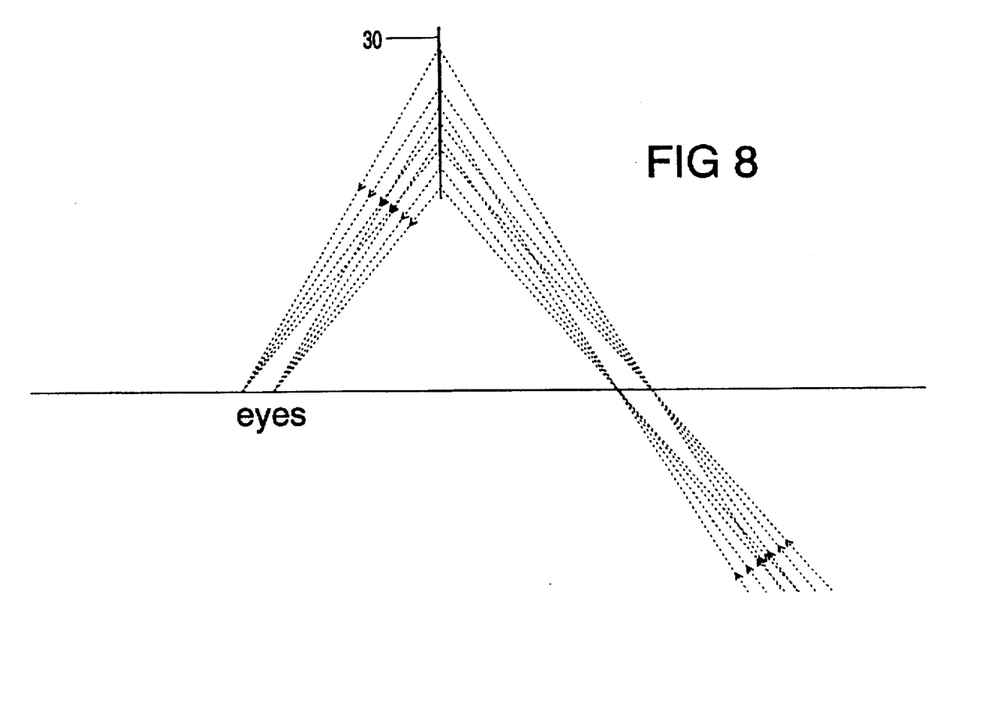
FIG. 8 is a beam field diagram for optical reflectors embodying the invention in the case of binocular vision.

The optical properties of the reflectors described above will now be discussed with reference to FIGS. 7 and 8. The principal difference in operation between the described optical reflectors and that of a conventional mirror is the behaviour of the object beam; the object beam is the ray pattern obtained on the object side of the reflector by tracing rays backwards from the eye(s) to the object. FIG. 7 illustrates the behaviour of the object beam for monocular vision while FIG. 8 demonstrates the same behaviour for binocular vision; in both cases the optical reflector of the invention is reference 30.

For distant objects, all the ray angles are the same as for a conventional mirror and viewing takes place normally. For nearer objects, however, some eye accommodation is required. This accommodation is in two forms, namely eye focus for each eye individually, and eye alignment for one eye related to the other.

Focusing requirements become significantly different from those of a conventional mirror only for very close objects, when the ray path length is considerably less than one meter, and so may be neglected for most applications including vehicle rear vision systems.

Alignment of the eyes, which is favourably parallel for distant objects, needs to be made to diverge for binocular vision of close objects, and this is not a natural action of human eyes. However, the amount of divergence required for objects more than five meters distance is very small, and this is easily accommodated by normal eyes. If binocular vision is required for objects closer than this, then a very small amount of curvature (that is convex towards the observer) may be applied to the optical reflector 30, typically a radius of curvature of a few tens of meters; this will obviate the need for the eyes to diverge at all.

Stronger curvature, of the order of one meter radius, may be used in conjunction with progressively changing values of one or more physical parameters of the elemental reflecting surfaces and/or elemental refractor facets in order to achieve specific optical or physical design characteristics.

The physical parameters subject to such alteration may, for example, include the surface/facet dimensions and their inclination. Of course, progressive variation of the physical parameters can be effected independently of any curvature applied to the optical reflector as a whole.

Figure 9:
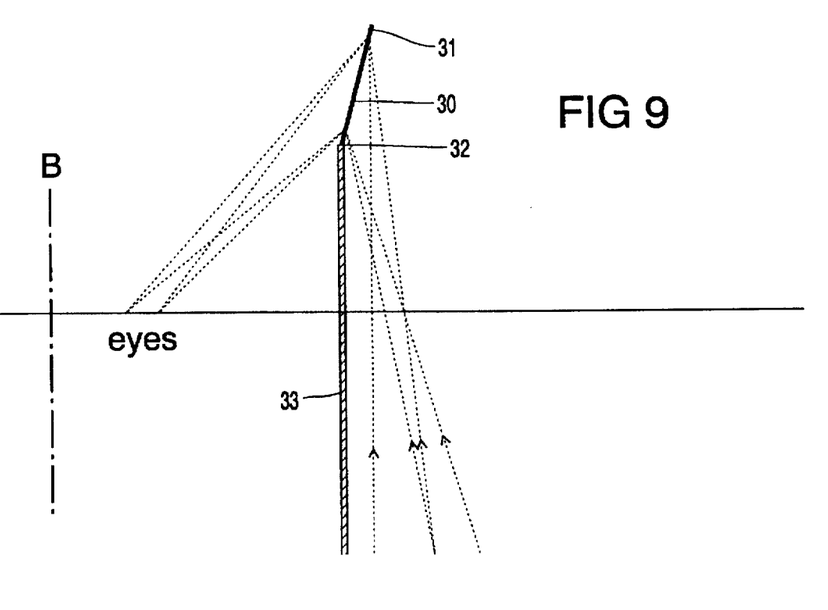
FIG. 9 is a beam field diagram showing a preferred mounting alignment of the optical reflector when used as a vehicle rear-view mirror.
Figure 10:
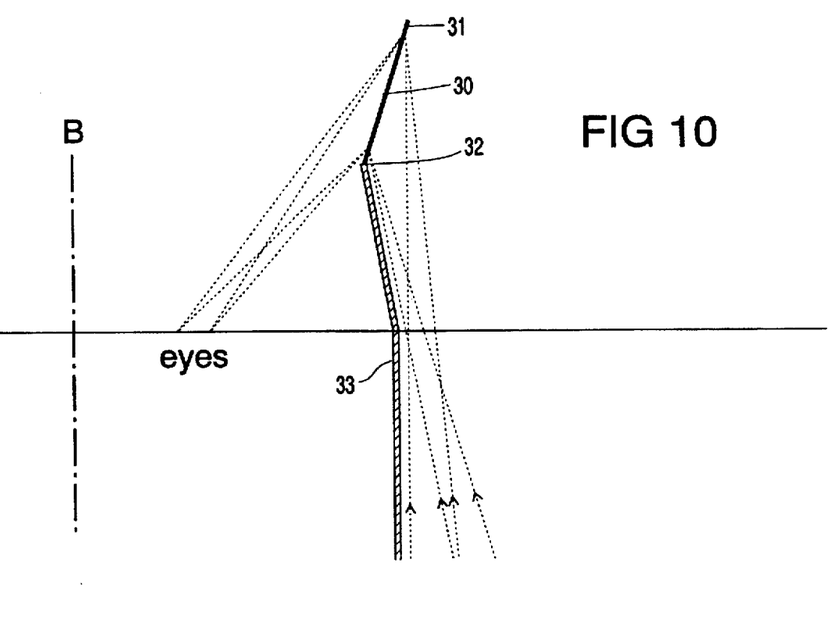
FIG. 10 is a diagram similar to that of FIG. 9 but showing how the vehicle window contour can be adapted to reduce the projection of the optical reflector beyond the natural envelope of the vehicle.

The described optical reflector can be advantageously used in a variety of applications where significant lateral extent of the reflector in the plane of the reflection is undesirable. One such application is the use of the reflector as an external rear-view mirror for a vehicle. FIGS. 9 and 10 illustrate use of the optical reflector 30 in such an application. From the earlier Figures it will be noted that narrow angle object rays are processed by the more distant end of the reflector and wide angle ones by the rear end. This characteristic of the reflector has important implications particularly when the reflector is used as a vehicle exterior rear-view mirror. More particularly, as can be seen in FIG. 9, the reflector 30 is best disposed at an angle to the longitudinal axis B of the vehicle with its front end 31 further from this axis than its rear end 32 (in FIG. 9, the exterior of the vehicle is to the right of the vehicle front side window glass 33, the vehicle illustrated being a right-hand drive vehicle). It will be noted that no part of the reflector 30 protrudes beyond that part of the reflector which reflects the narrowest angle ray; this, of course, is in contrast to a conventional mirror where the majority of the mirror protrudes beyond the part which reflects the narrowest angle ray.

This property of the reflector 30 may be used to obtain an improved view behind the vehicle or it may be used to reduce even further the exterior protrusion of the reflector. This latter possibility is illustrated in FIG. 10 where the side window glass 33 is illustrated as having been given a particular inwardly angled form enabling protrusion of the reflector 31 to be minimised while still permitting a view down the side of the vehicle.

With the described reflector, except in the case of symmetry of both physical geometry of the reflector and the entry and exit light beams, optical aberrations are present in the image beam. However, by careful design using design criteria known to persons skilled in the art, these optical aberrations may generally be kept within the bounds of subjective acceptability.

Figure 11:
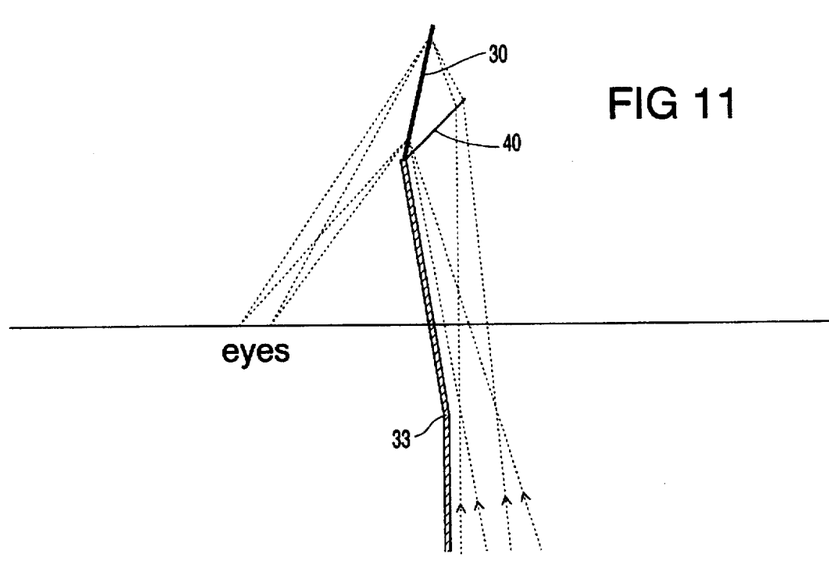
FIG. 11 is a diagram similar to that of FIG. 9 but with an additional refractor interposed in the beam path.

If required, additional refractors may be interposed in either or both of the entry and exit beams to condition further the optics and these refractors may either be of the solid or Fresnel prism type. Thus, for example, FIG. 11 illustrates the use a Fresnel prism type refractor 40 interposed in the entry beam for the optical reflector of FIG. 10. It will be appreciated that one or more refractors may also be positioned between the reflector 30 and the observer instead of or as well as the refractor shown in FIG. 11. Moreover, conventional prism refractors may be employed rather than Fresnel prisms. Although such prisms are shown in close proximity to the reflector they could be located spaced therefrom, especially if this facilitates the passage between them of an opening side window.

Figure 12:
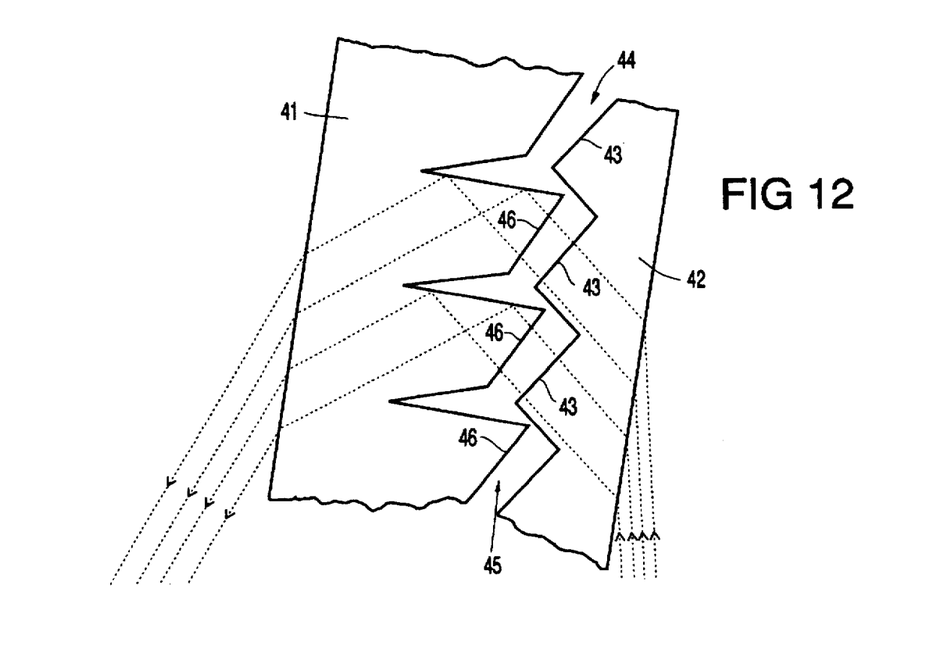
FIG. 12 is a diagram of a first optical assembly in which an implementation of the third form of optical reflector is combined with a refractor.

Design flexibility of the assembly of the optical reflector and one or more additional refractors is enhanced not only by the choice of geometry for each additional refractor but also by the material used for the refractor; advantageously, this material may possess a different refractive index and dispersive power from that used for the optical reflector of FIG. 2 onwards. FIG. 12 illustrates a preferred assembly of optical reflector 41 and an additional refractor 42, the reflector 41 being of the general form illustrated in FIGS. 3 to 6 in the FIG. 12 example, the additional refractor 42 being an object beam refractor and, as can be seen, the refractor being formed with precision refracting facets 43 along one face 44. This face 44 is turned towards the slotted entry face 45 which is also formed with precision, angle refracting facets 46. Although in FIG. 12 the reflector 41 and the refractor 42 are shown spaced part, in the final assembly these elements are preferably in contact with each other to form a robust body in which the precision refracting and reflecting elemental facets of the assembly lie internally and are protected from abrasion, dust and other potential environmental damage.

Figure 13:
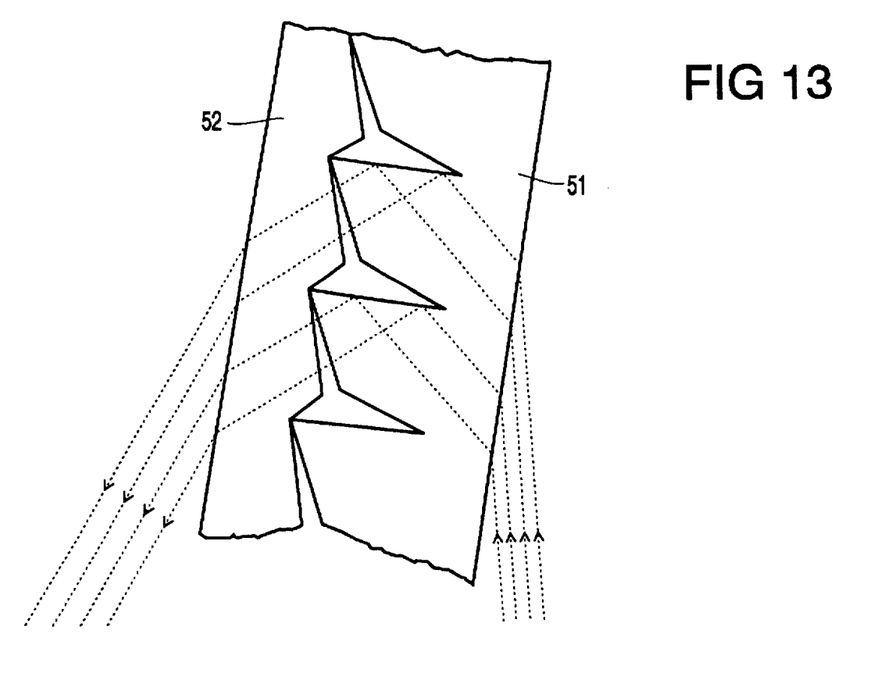
FIG. 13 is a diagram of a second optical assembly in which another implementation of the third form of reflector is combined with another refractor.

FIG. 13 shows another assembly of an optical reflector 51 of the general form shown in FIGS. 3 to 6, together with an additional image beam refractor 52, the two components being shown in their assembled position. As with the FIG. 12 assembly, the arrangement of FIG. 13 provides protection for the precision elemental reflecting and refracting elemental facets of the assembly.

Figure 14:
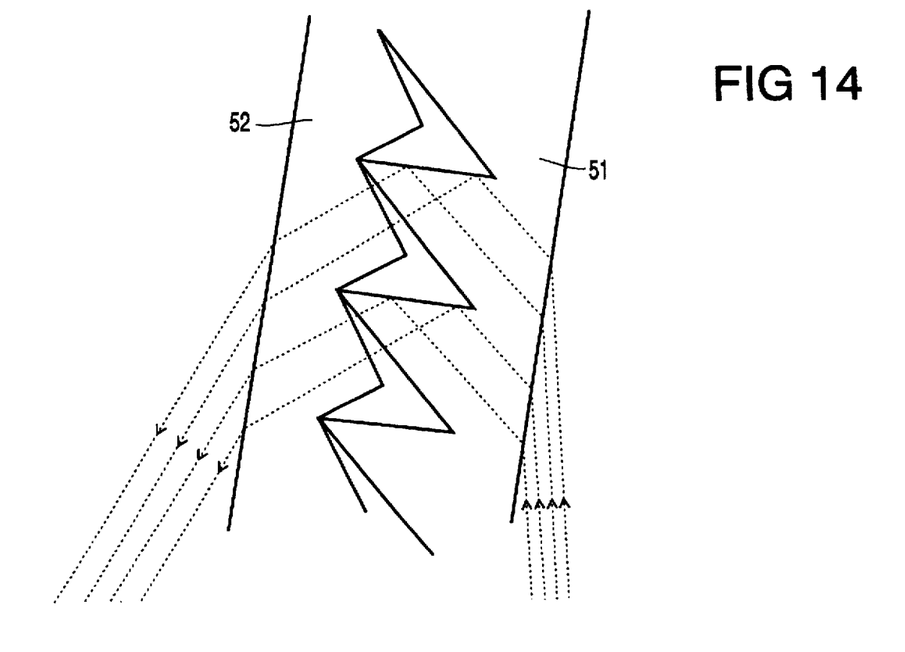
FIG. 14 is a diagram of a third optical assembly in which a further implementation of the third form of reflector is combined with a further refractor.

FIG. 14 illustrates an assembly similar to that of FIG. 13 but for simplified configurations of optical reflector 51 and image-beam refractor 52.

Figure 15:
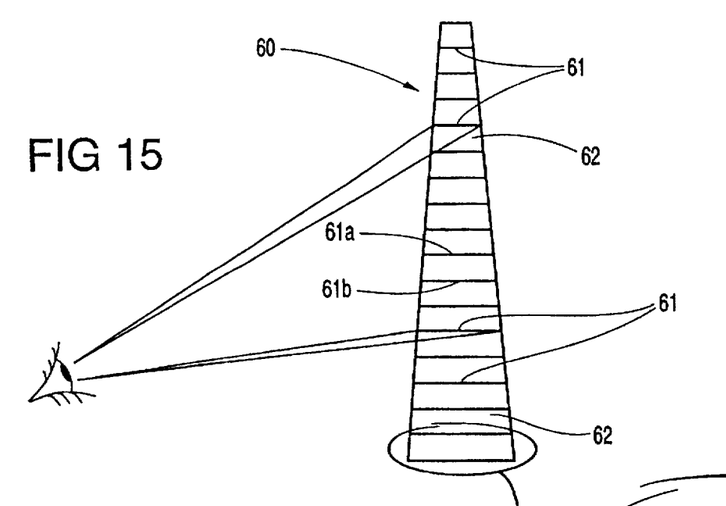
FIG. 15 is a schematic view of a further embodiment of the invention suitable for use as a motor vehicle rear-view mirror.

FIG. 15 shows in schematic form a mirror 60 suitable for any application where the field of view is wide, for example, for use in a motor vehicle rear-view mirror. In such an application, because the reflected image may be viewed over a relatively wide angle, typically between 30° and 45°, the angle subtended at the eye by the two opposite edges of a reflector in the forward part of the reflector assembly, which is further from the eye, is rather greater than the angle subtended at the eye by the rearwardly located reflectors. This could result in a broken image if an embodiment such as that shown in FIGS. 1 and 2 is used for this purpose since constant spacing between reflectors and constant reflector width would allow light to reach the observer from a point forward of the observer by transmission through the assembly between adjacent reflectors as shown by way of example by the arrow X in FIG. 1. It will be appreciated here that in the description of the embodiment of FIG. 1 the position of the observer was assumed to be somewhat further to the rear so that in practice light arriving along the path of the arrow A would not reach the observer's eyes; however, if the observer's position was different and had to be, for example, closer to the optical reflector or more forwardly located than previously assumed, then light from the position of arrow A could arrive at the observer's eye and result in a broken image. In order to overcome this potential problem one of two alternative modifications to the reflector arrays of the preceding Figures may be employed, namely the spacing between reflectors may be varied along the length of the array or the width of the reflectors may be different along the length of the array. One example of this latter arrangement is illustrated in FIG. 15, where it will be seen that the width of the reflectors 61 increases towards the rear of the array such that no light can reach the observer by direct transmission through the array. Ideally, in the viewing position shown, and considering just two of the reflectors, 61a, 61b of the array, the right hand edge of the reflector 61a furthest from the observer should be in alignment with the left hand edge of the nearer reflector 61b at the observer's eye. Obviously this is an idealised situation since it does not take into account binocular vision or the fact that the observer's head, and therefore his eyes, do not occupy a fixed location in space but may move around within a limited volume. In fact to accommodate both of these factors a small degree of overlap rather than exact alignment may be tolerable. It will be appreciated, however, that any overlap will result in a certain loss of light through the reflector. In most illumination conditions this is tolerable, and appropriately handled, e.g. by using black surfaces for any non-transmissive or non-reflective faces of the device, will not result in any appreciable problems.

The embodiment of FIG. 15 is made from a stacked array of strip-like elements 62 each having two opposite substantially parallel faces 62a, 62b (see inset to FIG. 15, which illustrates just one such element) the interface between each of which and the contacting opposite face of the next adjacent element defines the reflector 61 by total internal reflection. The other opposite faces 62c, 62d of the element 62 are not parallel to one another in this embodiment, but rather define a trapezoidal section. Of course, in other embodiments these faces may indeed be parallel.

For any design using discrete elemental with at least two opposite faces parallel, the use of ordinary float glass offers potential savings in manufacturing complexity. For example, if the float faces are the refractor faces, then only one further face, namely the reflector, needs to be optically worked. Furthermore, designs based on discrete elements having at least one pair of opposing faces parallel are particularly easy to assemble with the necessary accuracy. This may be done, for example, by simply sandwiching the elements between additional sheets of float glass.

It has been found that in practice the aspect ratio, that is the ratio between the optical width of the reflectors and the spacing between reflectors is preferably of the order of 3:2. A practical embodiment employs a stacked array of elements 3 mm wide and 2 mm thick.

It will be appreciated that the various modifications and additions are possible to the described optical reflectors. Thus, for example, various surfaces of the reflector (and, where provided, any additional refractors) can be blackened—that is, provided with light absorbing coating—in order to reduce the intensity of light rays not passing through the reflector along the desired optical path.

Although the currently intended primary use of the invention relates to reflection of visible light, the term 'optical' is to be understood in a broader sense, including, for example, infra-red radiation.

In the embodiment of FIG. 11, it will be appreciated that the incident light rays arriving from an object to the rear of the vehicle have been illustrated at a much shallower angle to the longitudinal centreline of the vehicle than the reflected rays which are directed from the reflector 30 towards the observer's eyes. This asymmetry can be achieved not only by positioning the array of reflectors as a whole, as is shown in FIG. 11 but also by appropriate orientation of the individual elemental reflectors within the array. Thus, for example, by appropriate orientation of the elemental reflectors, the light paths of the embodiments of FIGS. 1 to 8, all of which have been shown symmetrical, could be made asymmetrical to take account of particular conditions, not only for use as a vehicle rear view mirror but for any of the other wide range of uses to which the optical reflector of the present invention may be applied. This asymmetry or "handing" of the entry and exit beams may also be facilitated by the use of refractors on the entry and exit sides of the reflector.

Furthermore, curvature of the reflector array either in a convex or concave sense (towards the observer) may be achieved by appropriate orientation of the element reflectors as well as curvature of the array itself by locating the reflectors in a non-rectilinear line. In this way, it may be arranged that the focal position is not necessarily symmetrical, nor necessarily the same in two planes orthogonal to one another. In other words, it is envisaged that the elemental reflectors may, themselves, be composed of sub-elements each of which may be inclined differently from its neighhour to a given flat plane.

What is claimed is:

1. An optical reflector comprising a plurality of elongate elemental reflectors in a longitudinally directed array of such and spaced from one another in a direction generally parallel to a reflector optical axis whereby to provide a composite image of an object viewed from at least a limited range of angles to one side of the array, wherein each of said elemental reflectors is formed as a transparent facet of a transparent body having two opposed surfaces, whereby light entering said reflector through one of said surfaces and approaching said transparent elemental reflector facet through said body at an angle within a predetermined range of angles thereto is reflected by total internal reflection at said transparent elemental reflector facet and exits said reflector through the other of said surfaces, and whereby light approaching said transparent elemental reflector facet through said body at angles outside said range of angles is transmitted therethrough.

2. The optical reflector of claim 1, wherein said elemental reflectors are defined at the interfaces between a stacked array of elongate elements.

3. The optical reflector of claim 1 wherein each said transparent elemental reflector facet is formed as a surface of a body of refractive material having sides that constitute said two opposed surfaces.

4. The optical reflector of claim 3 further including at least one refractor positioned in a light path from an object to an observer via said at least one refractor and wherein one surface of said at least one refractor is provided with multiple refracting facets, said at least one refractor being assembled with said reflector such that said one surface of said reflector faces towards a face of said reflector which is provided with slots.

5. The optical reflector, of claim 4 wherein all refracting faces of said refractor and all the reflecting surfaces of said reflector are internal of the assembled reflector/refractor structure.

6. The optical reflector of claim 3, wherein said body of refractive material comprises a plurality of elements joined together, each element having a surface which provides a respective one of said facets.

7. The optical reflector of claim 1, wherein a physical parameter comprising one of a dimension, and an inclination relative to an exit associated surface of said elemental reflecting facets changes progressively along said array.

8. The optical reflector of claim 1, wherein said array is curved along an array main axis.

9. The optical reflector of claim 1, wherein said array is tapered along an array main axis.

10. The optical reflector of claim 1, wherein one of said opposed surfaces has, for each said transparent elemental reflector facet, a respective elemental refractor, said elemental refractor being angled such as to modify the optical characteristics of said transparent elemental reflector facet.

11. The optical reflector of claim 10, wherein a physical parameter comprising one of a dimension, and an inclination relative to an associated reflecting facet of each said elemental refractor changes progressively along said array.

12. The optical reflector of claim 1, further including at least one refractor positioned in a light path from an object to an observer via said reflector.

13. The optical reflector of claim 12, wherein said two opposed surfaces are oriented such that light entering said transparent body through a said surface is refracted towards a reflector facet and light exiting said transparent body through a said surface after reflection at a said facet is subject to refraction.

14. The optical reflector of claim 12 adapted as a rear view mirror for a vehicle wherein a forward end of said refractor lies further from a longitudinal center line of said vehicle than a rearward end thereof, and a forward end of said reflector array lies nearer the longitudinal centerline of said vehicle than a rearward end thereof.

15. The optical reflector of claim 14, wherein a rear part of said mirror lies inside an envelope of said vehicle whereby to minimize a lateral projection of said mirror beyond said envelope.

16. The optical reflector of claim 1, wherein the spacing between adjacent elemental reflectors varies along the array thereof.

17. The optical reflector of claim 1 adapted as a rear-view mirror for a vehicle wherein said array nearer a forward end of the reflector lies further from a longitudinal centerline of said vehicle than an end of the array nearer a vehicle rear.

18. The optical reflector of claim 1, wherein the dimensions of each said transparent elemental reflector facet in a direction transverse said array thereof between said two opposed surfaces is less than 1 mm.

19. An optical reflector comprising a plurality of elongate elemental reflectors in a longitudinally directed array of such and spaced from one another in a direction generally parallel to a reflector optical axis whereby to provide a composite image of an object viewed from at least a limited range of angles to one side of the array, wherein each of said elemental reflectors is formed as a transparent facet of a transparent body having two opposed surfaces, whereby light entering said optical reflector through one said surfaces and approaching a said transparent elemental reflector facet through said body at an angle within a predetermined range of angles thereto is reflected by total internal reflection at said transparent elemental reflector facet and exits said reflector through the other of said surfaces, and whereby light approaching said transparent elemental reflector facet through said body at angles outside said range of angles is transmitted therethrough, each said transparent elemental reflector facet being formed as a surface of a body of refractive material having sides that constitute said two opposed surfaces, and at least one of said two surfaces having slots extending towards the other said surface, one face of each said slot constituting a respective one of said transparent elemental reflector facets.

20. The optical reflector of claim 19, wherein said body of refractive material is formed in one piece.

* * * * *